(12) United States Patent
Saghir et al.

(10) Patent No.: US 12,309,685 B2
(45) Date of Patent: May 20, 2025

(54) SMALL CELL AGGREGATION SERVICE

(71) Applicant: Verizon Patent and Licensing Inc., Basking Ridge, NJ (US)

(72) Inventors: Amir Saghir, Frisco, TX (US); Said Hanbaly, Prosper, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 449 days.

(21) Appl. No.: 17/718,945

(22) Filed: Apr. 12, 2022

(65) Prior Publication Data

US 2023/0328627 A1 Oct. 12, 2023

(51) Int. Cl.
*H04W 40/24* (2009.01)
*H04W 8/26* (2009.01)
*H04W 16/32* (2009.01)
*H04W 40/02* (2009.01)
*H04W 48/16* (2009.01)
*H04W 88/16* (2009.01)

(52) U.S. Cl.
CPC ........ *H04W 40/246* (2013.01); *H04W 8/26* (2013.01); *H04W 16/32* (2013.01); *H04W 40/02* (2013.01); *H04W 48/16* (2013.01); *H04W 88/16* (2013.01)

(58) Field of Classification Search
None
See application file for complete search history.

(56) References Cited

U.S. PATENT DOCUMENTS

| 2017/0149692 A1* | 5/2017 | Allan | H04L 45/18 |
| 2023/0199480 A1* | 6/2023 | Tao | H04L 67/1021 |
| | | | 370/338 |

* cited by examiner

*Primary Examiner* — Minh Trang T Nguyen (57) ABSTRACT

A method, a device, and a non-transitory computer-readable storage medium are described in which a small cell aggregation service is provided. The service may include providing a global identifier for small cell devices that may be used for the transmission and reception of messages between small cell devices and core network devices. The service may include an intermediary network device, such as a gateway device or an aggregation device that uses the global identifier to transmit and receive control plane, user plane, or both types of messages, for example. The global identifier for the small cell device may include a globally unique identifier for the intermediary network device and an identifier of the small cell device. The identifier of the small cell device may indicate a sector or coverage area from among multiple sectors or coverage areas associated with the small cell device.

20 Claims, 8 Drawing Sheets

RECEIVE A MESSAGE THAT INCLUDES A SMALL CELL DEVICE GLOBAL IDENTIFIER
405

DETERMINE A NETWORK PATH BASED ON THE SMALL CELL DEVICE GLOBAL IDENTIFIER
410

TRANSMIT THE MESSAGE TO A SMALL CELL DEVICE BASED ON THE NETWORK PATH
415

SMALL CELL AGGREGATION SERVICE

BACKGROUND

Development and design of networks present certain challenges from a network-side perspective and an end device perspective. For example, Next Generation (NG) wireless networks, such as Fifth Generation New Radio (5G NR) networks are being deployed and under development.

DETAILED DESCRIPTION

The following detailed description refers to the accompanying drawings. The same reference numbers in different drawings may identify the same or similar elements. Also, the following detailed description does not limit the invention.

In order to provide and/or extend wireless signal coverage in a given geographic area, a provider of a wireless communication service may deploy small and/or low-power cellular radio access nodes. As such, the deployment of femtocells, picocells, microcells, and/or the like, for example, naturally leads to cell densification. Each small cell device, such as a femtocell device has a direct connection with a core network device. For example, the femtocell device may have a direct connection with a user plane function (UPF) and an access and mobility management function (AMF) of a Fifth Generation (5G) core network. Given this framework, there are various technological challenges that relate to scalability and link capacity associated with communication links between a radio access network and a core network; user plane traffic and control plane traffic; network communications and activities associated with a small cell device (e.g., maintenance, updates, pinging, rebooting, etc.); impacting core network communications and activities (e.g., logging, alarms, etc.); and taxing of network resources, network services, and operations of a network. Also, Internet Protocol (IP)-based backhaul links that may be used to connect small cell devices to a core network may be unreliable, lack security, and/or unable to support various performance metrics (e.g., quality of service (QoS), etc.) of an application service.

According to exemplary embodiments, a small cell aggregation service is described. According to an exemplary embodiment, the small cell aggregation service may be implemented by an intermediary network device, such as a gateway device, an aggregation device, a concentrator device, or similar network device (e.g., a relay server) that may manage and route traffic between small cell devices and another network device. For example, the intermediary network device may manage user plane and/or control plane traffic between small cell devices and a core network device, such as an AMF and/or a UPF of a core network.

According to an exemplary embodiment, the small cell aggregation service may aggregate control plane and/or user plane interfaces based on an identifier scheme. According to an exemplary embodiment, a global identifier may include a portion of bits that uniquely identifies the intermediary network device that is common for a set of small cell devices. According to an exemplary embodiment, the global identifier may include a remainder portion of the bits which may be used to differentiate each small cell device and/or a cell or a sector of each small cell device from among the set of small cell devices common to the intermediary network device. According to an exemplary embodiment, the global identifier may uniquely and globally identify each small cell device and/or the cell or the sector.

In this way, user plane and/or control plane interfaces, communication links, and traffic between small cell devices and core network devices may be aggregated and identified via the intermediary network device. Additionally, the intermediary network device may provide a consolidated connection and interface to core network devices, such as the UPF and the AMF, on behalf of the set of small cell devices. For example, the intermediary network device may aggregate traffic to and disaggregate traffic from the core network and other types of networks (e.g., an application layer network, such as a MEC network, Internet, cloud network, packet data network, data center, or the like).

In view of the foregoing, the small cell aggregation service may aggregate traffic and control plane and/or user plane interfaces between small cell devices and core network devices. For example, the intermediary network device may consolidate the multiple interfaces of the set of small cell devices to a single interface. The small cell aggregation service may improve link capacity, scalability, and various network operations, network procedures, and communications pertaining to small cell devices, as described herein. The small cell aggregation service may manage and route the traffic between small cell devices and a core network and/or another type of network based on the global identifier, as described herein. The small cell aggregation service may also improve reliability, security, and/or other performance metrics (e.g., bit rate, latency, etc.) relative to IP-based customer backhaul connections.

Control plane aggregation and/or user plane aggregation of the small cell aggregation service may provide a higher link capacity and facilitate 5G core network scalability as the number of small cell devices grow in the network. The control plane aggregation may be beneficial during maintenance and service disruptions of small cell devices which will become transparent to the core network. For example, femtocells may reboot because of software updates and configuration changes, surrounding Macro deployment updates/changes, and other activities that may trigger massive femtocell reboots/re-establishment resulting in excessive signaling. The control plane aggregation of the small cell aggregation service may also avoid backhaul (Internet Service Provider (ISP)) issues impacting 5G core operations (logs/alarms etc.) and interface reliability relating to a customer backhaul. Additionally, user plane aggregation may make tunneling issues (e.g., bounce, re-establishments) transparent to the 5G core network.

Figure 1:
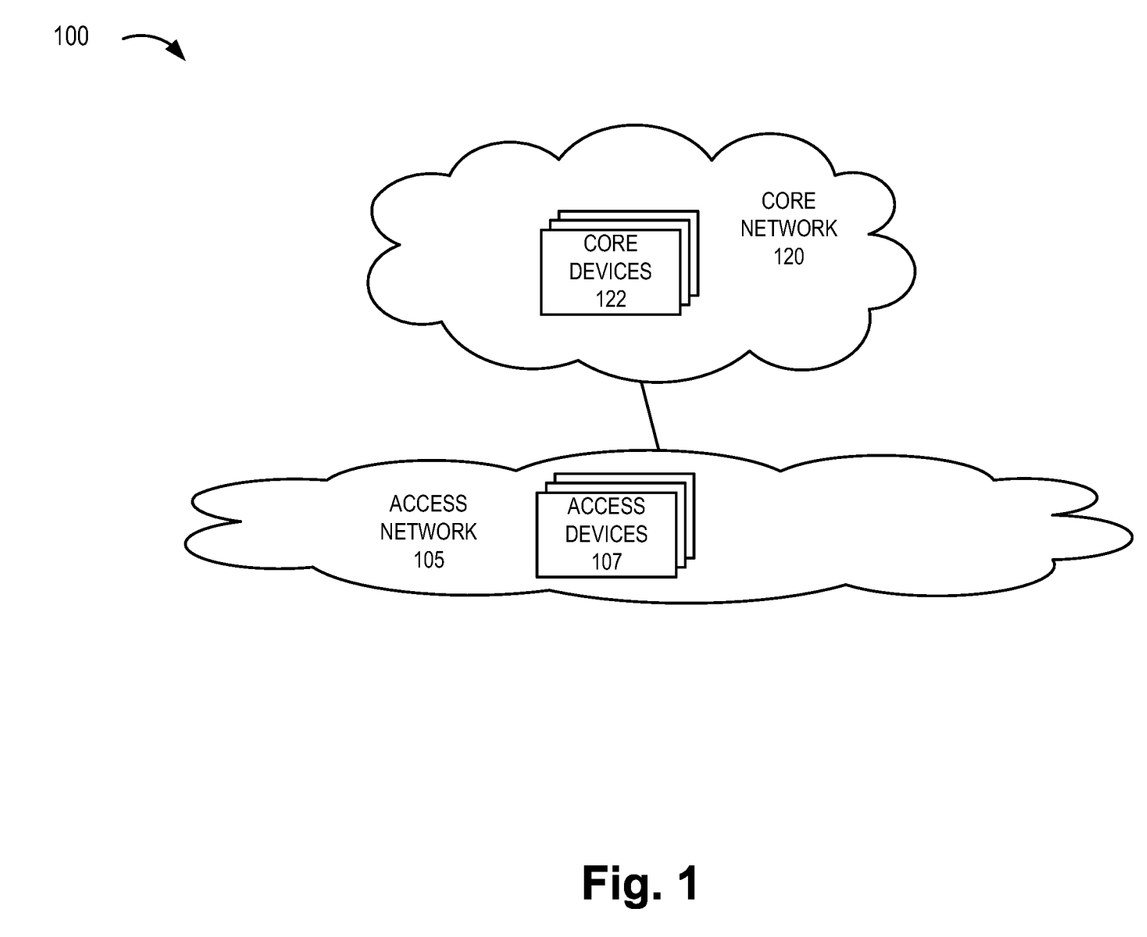
FIG. 1 is a diagram illustrating an exemplary environment in which an exemplary embodiment of a small cell aggregation service may be implemented.

FIG. 1 is a diagram illustrating an exemplary environment 100 in which an exemplary embodiment of a small cell aggregation service may be implemented. As illustrated, environment 100 includes an access network 105 and a core network 120. Access network 105 includes access devices 107 (also referred to individually or generally as access device 107). Core network 120 includes core devices 122 (also referred to individually or generally as core device 122).

According to an exemplary embodiment of environment 100, at least some of access devices 107 may be provisioned in accordance with an exemplary embodiment of the small cell aggregation service, as described herein.

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), an application layer network (e.g., a mobile edge computing (MEC) network, the Internet, or the like), or another type of network that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud, and/or another type of computing architecture, and may be incorporated into distinct types of network architectures (e.g., Software Defined Networking (SDN), virtual, logical, network slice, etc.). The number, the type, and the arrangement of network devices are exemplary.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the small cell aggregation service may use at least one of these planes of communication. Additionally, an interface of a network device may be modified (e.g., relative to an interface defined by a standards body, such as Third Generation Partnership Project (3GPP), 3GPP2, International Telecommunication Union (ITU), European Telecommunications Standards Institute (ETSI), GSM Association (GSMA), and the like) or a new interface of the network device may be provided in order to support the communication (e.g., transmission and reception of messages, an information element (IE), an attribute value pair (AVP), an object, a parameter, or another form of a data instance) between devices and small cell aggregation service logic of the device. According to various exemplary implementations, the interface of the network device may be a service-based interface, a reference point-based interface, an Open Radio Access Network (O-RAN) interface, a 5G interface, another generation of interface (e.g., 5.5G, Sixth Generation (6G), Seventh Generation (7G), etc.), or some other type of network interface.

Access network 105 may include one or multiple networks of one or multiple types and technologies. For example, access network 105 may be implemented to include a 5G RAN, a future generation RAN (e.g., a 6G RAN, a 7G RAN, or a subsequent generation RAN), a centralized-RAN (C-RAN), an O-RAN, and/or another type of access network. Access network 105 may include a legacy RAN (e.g., a Fourth Generation (4G) or 4.5 RAN, etc.). Access network 105 may communicate with and/or include other types of access networks, such as, for example, a Wi-Fi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105.

Access network 105 may include different and multiple functional splitting, such as options 1, 2, 3, 4, 5, 6, 7, or 8 that relate to combinations of access network 105 and a core network 120 including, for example, an evolved packet core (EPC) network and/or a 5G core network, or the splitting of the various layers (e.g., physical layer, medium access control (MAC) layer, radio link control (RLC) layer, packet data convergence protocol (PDCP) layer, and/or other layers), plane splitting (e.g., user plane, control plane, etc.), interface splitting (e.g., F1-U, F1-C, F2-C, F2-U, E1, Xn-C, Xn-U, X2-C, Common Public Radio Interface (CPRI), etc.) as well as other types of network services, such as dual connectivity (DC) or higher, carrier aggregation (CA), edge and core network slicing, coordinated multipoint (CoMP), various duplex schemes, and/or another type of connectivity service (e.g., non-standalone (NSA) new radio (NR), standalone (SA) NR, and the like).

Depending on the implementation, access network 105 may include one or multiple types of network devices, such as access devices 107. For example, access device 107 may include a next generation Node B (gNB), an evolved LTE (eLTE) evolved Node B (eNB), an eNB, a radio network controller (RNC), a remote radio head (RRH), a baseband unit (BBU), a radio unit (RU), a remote radio unit (RRU), a centralized unit (CU), a CU control plane (CU-CP), a CU user plane (CU-UP), a distributed unit (DU), a small cell device (e.g., a picocell device, a femtocell device, a microcell device, a home gNB, or another types of low power cellular network device), an open network device (e.g., O-RAN Centralized Unit (O-CU), O-RAN Distributed Unit (O-DU), or the like), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Access device 107 may also include other types of network devices, such as a radio network controller (RNC), a RAN Intelligent Controller (RIC), an orchestrator device, an artificial intelligence (AI) and/or machine learning (ML) device, or another type of RAN management or control level network device.

According to various exemplary implementations, access device 107 may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) and adaptive beamforming (also known as full-dimensional agile MIMO), two dimensional (2D) beamforming, antenna spacing, tilt (relative to the ground), radiation pattern, directivity, elevation, planar arrays, and so forth. Depending on the implementation, access device 107 may provide a wireless access service at a cell, a sector, a sub-sector (also known as a geo-bin), and/or another configurable level.

According to an exemplary embodiment, some of access devices 107 include logic that provides the small cell aggregation service. For example, the logic of a small cell device may include generating and transmitting messages that include the global small cell device identifier, as described herein. The logic of the small cell device may include performing other types of wireless service operations and/or procedures (e.g., maintenance activities, updating, handovers, reporting (e.g., network performance, congestion, etc.)) based on the global small cell device identifier, as described herein.

Additionally, for example, the logic of an intermediary network device may include generating and transmitting messages that include the global small cell device identifier, as described herein. The logic of the intermediary network device may include routing traffic to a small cell device and core network devices based on the global small cell device identifier, as described herein. The logic of the intermediary network device may also consolidate the multiple interfaces of the set of small cell devices to a single interface and may improve link capacity, scalability, and various network operations, network procedures, and communications pertaining to small cell devices, as described herein.

Core network 120 may include one or multiple networks of one or multiple network types and technologies. Core network 120 may include a complementary network of access network 105. For example, core network 120 may be implemented to include a 5G core network, an evolved packet core (EPC) of a Long Term Evolution (LTE) network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include diverse types of network devices that are illustrated in FIG. 1 as core devices 122. For example, core devices 122 may include a UPF, a Non-3GPP Interworking Function (N3IWF), AMF, a session management function (SMF), a unified data management (UDM) device, a unified data repository (UDR), an authentication server function (AUSF), a network slice selection function (NSSF), a network repository function (NRF), a policy control function (PCF), a binding support function (BSF), a network data analytics function (NWDAF), a network exposure function (NEF), a service capability exposure function (SCEF), a lifecycle management (LCM) device, an application function (AF), a mobility management entity (MME), a packet gateway (PGW), an enhanced packet data gateway (ePDG), a serving gateway (SGW), an application function (AF), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), a charging system (CS), and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), and/or other combined nodes (e.g., an HSS with a UDM and/or UDR, an MME with an AMF, etc.). Also, core devices 122 may include a split core device 122. For example, core devices 122 may include a session management (SM) PCF, an access management (AM) PCF, a user equipment (UE) PCF, and/or another type of split architecture associated with another core device 122, as described herein.

Figure 2A:
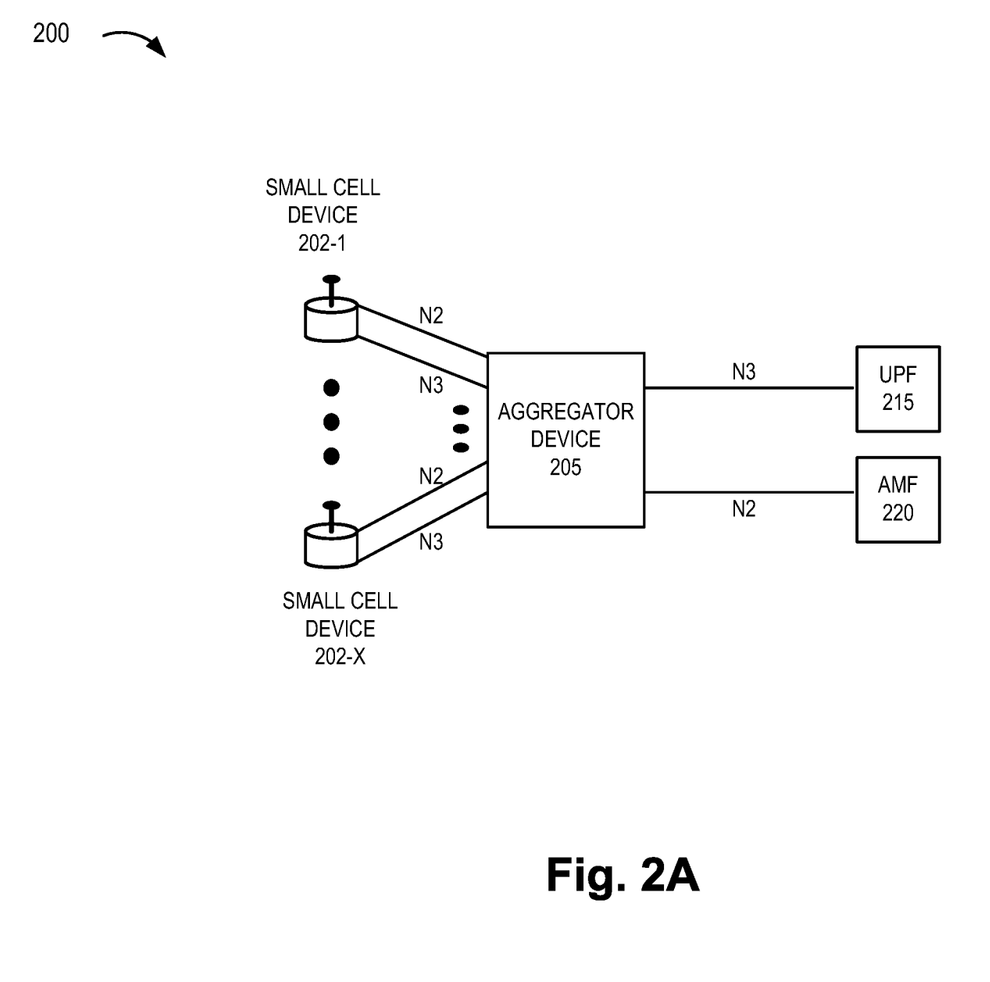
FIG. 2A is a diagram illustrating another exemplary environment in which an exemplary embodiment of the small cell aggregation service may be implemented.

FIG. 2A is a diagram illustrating an exemplary environment 200 in which an exemplary embodiment of an exemplary process of the small cell aggregation service may be implemented. As illustrated, environment 200 may include small cell device 202-1 through 202-X (also collectively referred to as small cell devices 202 and generally or individually as small cell device 202), an aggregator device 205, a UPF 215 and an AMF 220. Similar to that described in relation to FIG. 1 and environment 100, the number, type, and arrangement of network devices illustrated in environment 200 are exemplary. Additionally, the number, type, and arrangement of communication links illustrated in environment 200 are exemplary.

For purposes of description, 5G reference point interfaces N2 and N3 are depicted. According to other exemplary embodiments, depending on the core network, non-5G interfaces and/or non-reference point interfaces may be implemented for control plane and user plane traffic between access network 107 and core network 120.

Small cell device 202 may be implemented as a femtocell device, a picocell device, a microcell device, or another type of low-powered cellular radio access node. Small cell device 202 may be implemented in a 5G deployment, a legacy deployment (e.g., 4G, 4.5G), or a future generation deployment (e.g., 5.5G, 6G, etc.). According to various exemplary embodiments, small cell device 202 may or may not differ among another small cell device 202 based on various features, such as coverage area, power, number of users supported, radio spectrum (e.g., radio frequency, radio band, etc.), and/or application (e.g., outdoor, indoor, rural, urban, remote area, etc.), for example.

According to an exemplary embodiment, small cell device 202 may provide a wireless service based on the global small cell device identifier, as described herein. For example, small cell device 202 may generate and transmit/receive user plane and control plane messages to/from UPF 215 and AMF 220 via aggregator device 205. According to some exemplary embodiments, small cell device 202 may support multiple and different radio spectrum (e.g., carriers, frequency bands, radio beams, etc.). For example, a 5G wireless service may include certain categories of radio frequency bands, such as above 6 GHz and below 6 GHz, as well as other nomenclatures, such as sub-3 (e.g., below 3 GHz), mid-band (e.g., between 3 GHz and 6 GHz), low band, millimeter wave (mm Wave), above mm Wave, and so forth. According to some exemplary embodiments, small cell device 202 may provide wireless service to multiple and different coverage areas (e.g., sectors, sub-sectors, etc.) according to multiple and different radio spectrum that may be used by various types of end device (e.g., user equipment, mobile devices, Internet of Things (IoT) devices, and the like) (not illustrated). According to an exemplary embodiment, the global small cell device identifier may globally and uniquely identify each of such coverage areas.

Aggregator device 205 may be implemented as a gateway device or a concentrator device, for example. According to an exemplary embodiment, aggregator device 205 may include logic of an exemplary embodiment of the small cell aggregation service. For example, aggregator device 205 may aggregate and disaggregate both control plane and user plane traffic of the N2 and N3 interfaces based on the global small cell device identifier scheme, as described herein. According to some exemplary embodiments, aggregator device 205 may be an access device 107 that resides in access network 105.

Figure 2B:
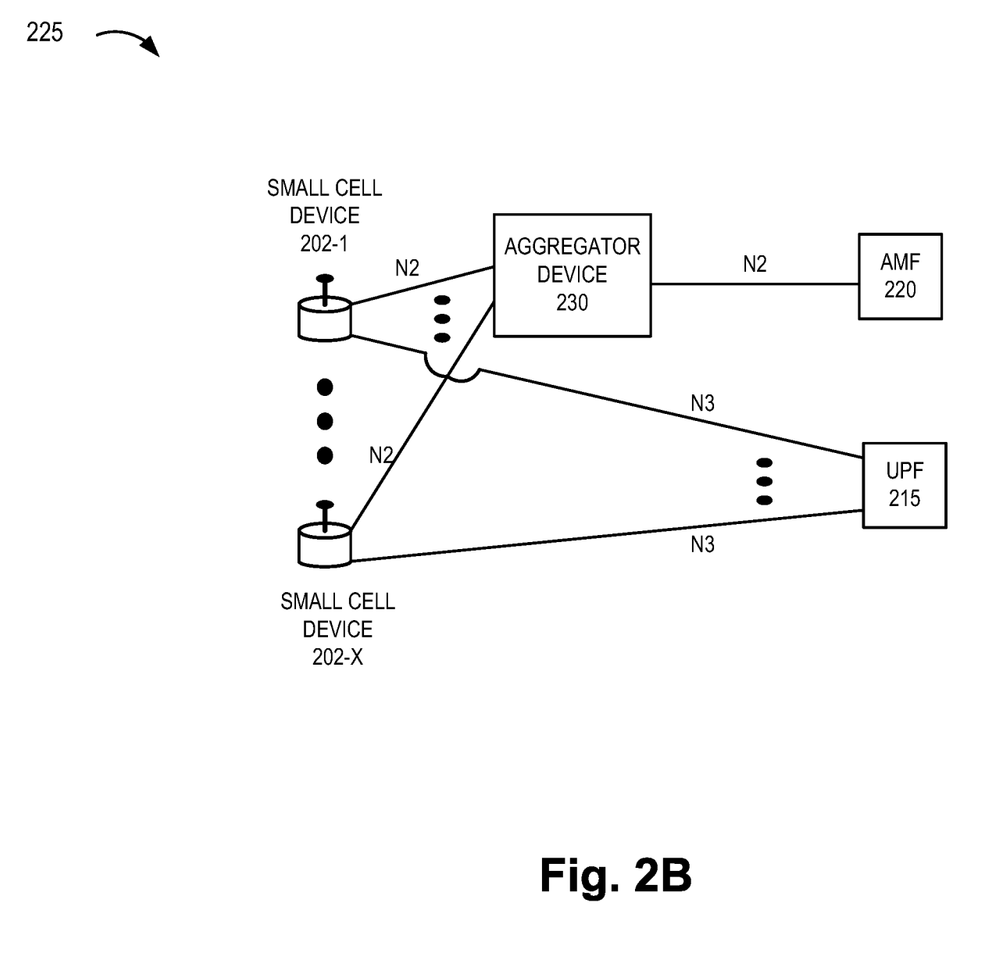
FIG. 2B is a diagram illustrating still another exemplary environment in which an exemplary embodiment of the small cell aggregation service may be implemented.
Figure 2C:
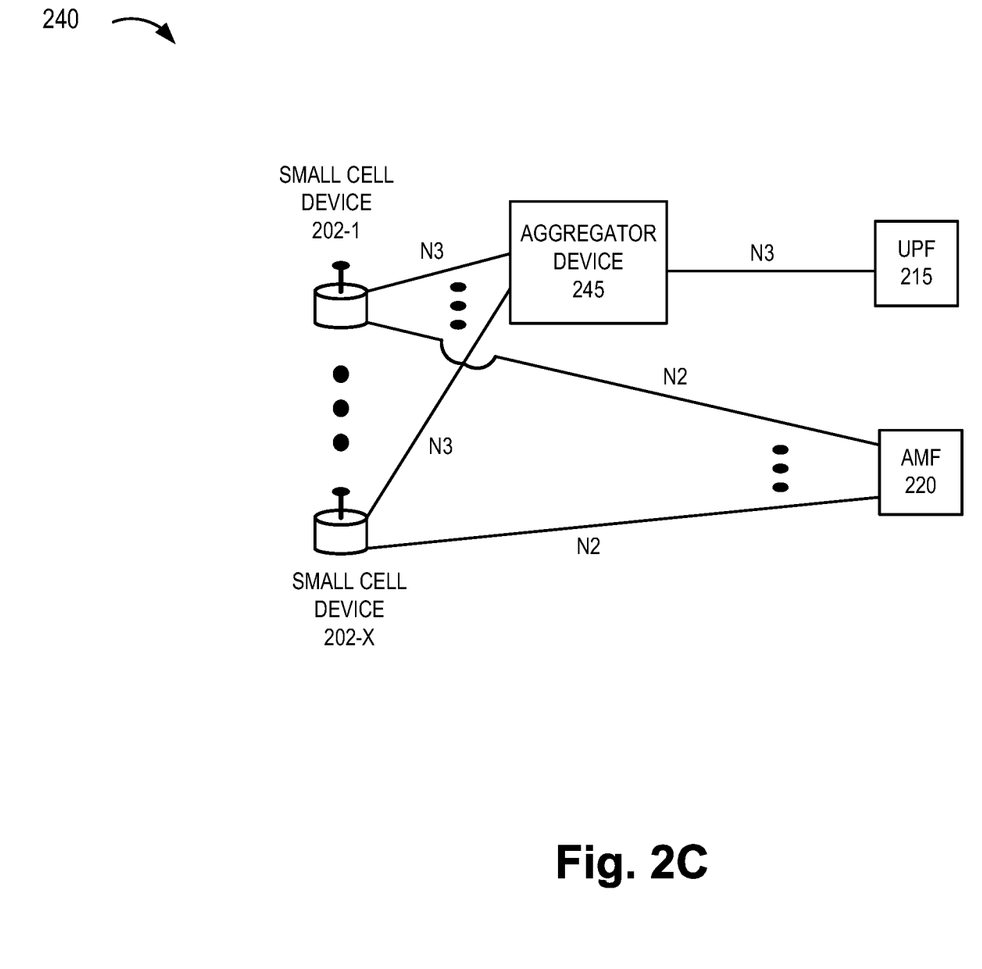
FIG. 2C is a diagram illustrating yet another exemplary environment in which an exemplary embodiment of the small cell aggregation service may be implemented.
Figure 2D:
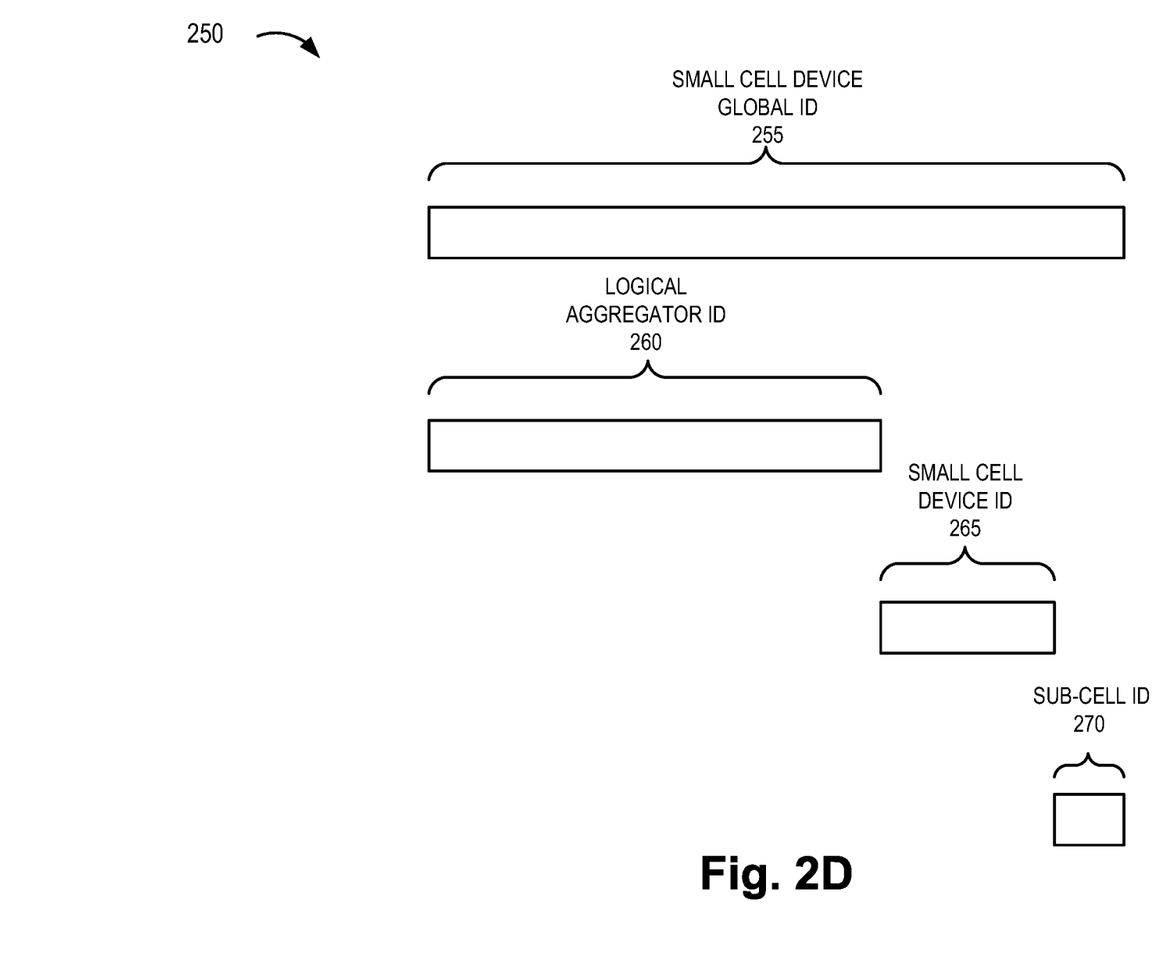
FIG. 2D is a diagram illustrating an exemplary embodiment of a global small cell device identifier scheme associated with the small cell aggregation service.

Referring to FIG. 2D, an exemplary embodiment of the global small cell device identifier structure 250 is illustrated. As illustrated, a small cell device global identifier 255 may include an aggregator identifier 260, a small cell device identifier 265, and a sub-cell identifier 270. According to other exemplary embodiments, global small cell device identifier structure 250 may include fewer identifiers and/or additional identifiers. For example, small cell device global identifier 255 may omit sub-cell identifier 270.

According to an exemplary embodiment, the number of bits of small cell device global identifier 255 may be the same as a radio access network (RAN) device global identifier (e.g., a global gNB ID or a NR cell identity (NCI)) of a standard (e.g., 3GPP, 3GPP2, etc.). According to other exemplary embodiments, the number of bits of small cell device global identifier 255 may be different (e.g., fewer bits, greater number of bits) from a RAN device global identifier of a standard. Consequently, the number of bits allocated to any sub-identifier included in small cell device global identifier 255 may vary among various exemplary embodiments.

For purposes of description, small cell device global identifier 255 will be described as 36 bits in length. However, according to other exemplary embodiments, small cell device global identifier 255 may include an additional number or a fewer number of bits. According to various exemplary embodiments and according to the exemplary 36 bit length, aggregator identifier 260 may be allocated between 22 bits through 32 bits. Aggregator identifier 260 may identify aggregator device 205. Aggregator identifier 260 may be globally unique within a network (e.g., access network 105, access network 105 and core network 120, etc.).

Small cell device identifier 265 may be allocated a remainder portion of bits of the small cell device global identifier 255 or another portion of bits of the small cell global identifier 255 (e.g., when sub-cell identifier 270 may be implemented). For example, according to the 36 bit length example, small cell device identifier 265 may have a bit length between 4 bits through 14 bits. Small cell device identifier 265 may identify small cell device 202 among small cell devices 202 that are connected to aggregator device 205. Small cell device identifier 265 may not be globally unique.

Sub-cell identifier 270 may be allocated any remaining number of bits in view of aggregator identifier 260 and small cell device identifier 265. Sub-cell identifier 270 may indicate a portion of radio spectrum (e.g., a frequency band, a carrier, etc.) associated with small cell device 202. According to other examples, sub-cell identifier 270 may indicate a sub-coverage area (e.g., a sector, etc.) that is among multiple coverages area (e.g., sectors, etc.) of small cell device 202. Additionally, or alternatively, sub-cell identifier 270 may indicate an operator associated with small cell device 202, which may differ among small cell devices 202 and/or may differ from an operator associated with aggregator device 205. According to various exemplary embodiments, small cell device identifier 265 or the combination of small cell device identifier 265 and sub-cell identifier 270 may uniquely identify small cell device 202 or a frequency/band/sub-coverage area of small cell device 202 among the set of small cell devices 202 that are common to aggregator device 205.

Referring back to FIG. 2A, the N2 and N3 reference point interfaces between aggregator device 205 and AMF 220 and UPF 215, respectively, may provide a reduction in connections that would otherwise exist if not for aggregator device 205. For example, assume that there are 1024 small cell devices 202. Small cell device identifier 265 may identify 1024 different small cell devices 202, and each of the N2 and N3 interfaces and connections between aggregator device 205 and AMF 220 and UPF 215 may provide a reduction of 1024:1.

UPF 215 and AMF 220 may each include logic that provides services according to a network standard (e.g., 3GPP, 3GPP2, etc.) and/or of a proprietary nature. For example, UPF 215 may function as an external PDU session point of interconnect to a data network, provide packet inspection, user plane part of policy rule enforcement, traffic usage reporting, QoS handling for user plane, transport level packet marking, among other functions. AMF 220 may provide registration, connection, reachability, and mobility management, security context management, location service management, UE mobility event notification, among other functions. According to an exemplary embodiment, UPF 215 and AMF 220 may include logic that provides UPF and AMF services, respectively, based on the small cell aggregation service and the small cell device global identifier scheme, as described herein.

FIG. 2A is a diagram illustrating an exemplary environment in which an exemplary process of the small cell aggregation service may be implemented. According to other exemplary embodiments, the exemplary environment may be different and/or the exemplary process may include additional, different, or fewer operations than those illustrated and described in relation to FIG. 2A.

FIG. 2B is a diagram illustrating another exemplary environment 225 in which an exemplary embodiment of an exemplary process of the small cell aggregation service may be implemented. Similar to that described in relation to FIG. 1 and environment 100, the number, type, and arrangement of network devices illustrated in environment 225 are exemplary. Additionally, the number, type, and arrangement of communication links illustrated in environment 200 are exemplary.

Referring to FIG. 2B, in contrast to environment 200 of FIG. 2A, an aggregator device 230 may provide the small cell aggregation service in relation to control plane traffic but not user plane traffic for small cell devices 202. Small cell device 202 and AMF 220 may operate according to the small cell aggregation service and associated small cell device global identifier scheme, as described herein.

FIG. 2B is a diagram illustrating an exemplary environment in which an exemplary process of the small cell aggregation service may be implemented. According to other exemplary embodiments, the exemplary environment may be different and/or the exemplary process may include additional, different, or fewer operations than those illustrated and described in relation to FIG. 2B.

FIG. 2C is a diagram illustrating yet another exemplary environment 240 in which an exemplary embodiment of an exemplary process of the small cell aggregation service may be implemented. Similar to that described in relation to FIG. 1 and environment 100, the number, type, and arrangement of network devices illustrated in environment 240 are exemplary. Additionally, the number, type, and arrangement of communication links illustrated in environment 240 are exemplary.

Referring to FIG. 2C, in contrast to environments 200 and 225 of FIGS. 2A and 2B, respectively, an aggregator device 245 may provide the small cell aggregation service in relation to user plane traffic but not control plane traffic for small cell devices 202. Small cell device 202 and UPF 215 may operate according to the small cell aggregation service and associated small cell device global identifier scheme, as described herein.

FIG. 2C is a diagram illustrating an exemplary environment in which an exemplary process of the small cell aggregation service may be implemented. According to other exemplary embodiments, the exemplary environment may be different and/or the exemplary process may include additional, different, or fewer operations than those illustrated and described in relation to FIG. 2C.

According to other exemplary embodiments, in relation to FIGS. 2A-2C, there may be multiple aggregator devices 205 connected to small cell devices 202. For example, a primary aggregator device may connect to multiple secondary aggregator devices, which in turn may connect to different sets of small cell devices 202. According to such an embodiment, small cell device global identifier 255 may include a globally unique identifier for the primary aggregator device and a globally unique identifier for the second aggregator device, along with various implementations of small cell device identifier 265 and sub-cell identifier 270, as described herein.

Figure 3:
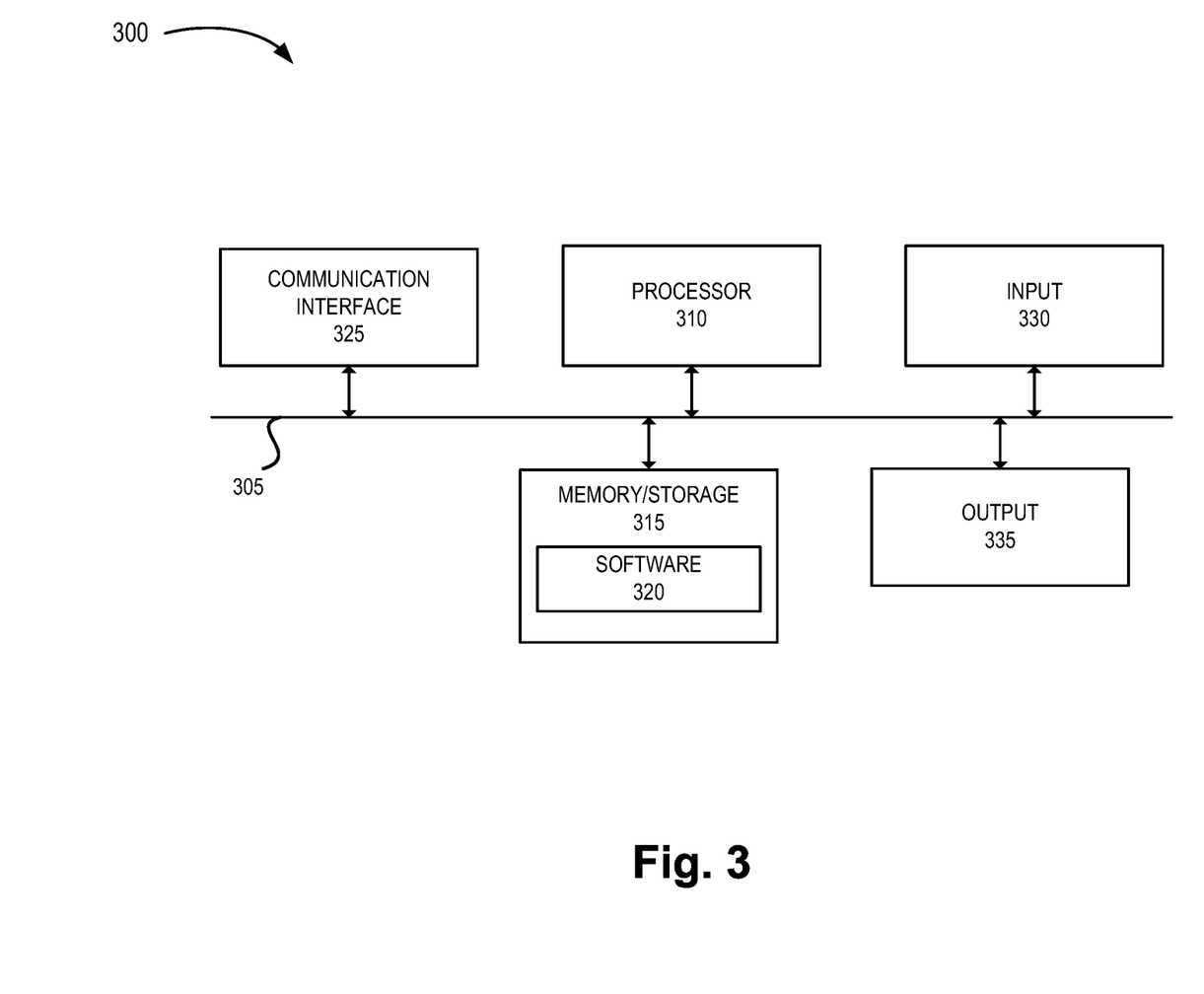
FIG. 3 is a diagram illustrating exemplary components of a device that may correspond to one or more of the devices illustrated and described herein.

FIG. 3 is a diagram illustrating exemplary components of a device 300 that may be included in one or more of the devices described herein. For example, device 300 may correspond to access device 107, core device 122, small cell device 202, aggregator device 205, UPF 215, AMF 220, aggregator device 230, aggregator device 245, and/or other types of devices, as described herein. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation, or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, learning, model-based, etc.

Memory/storage 315 includes one or multiple memories and/or one or multiple other types of storage mediums. For example, memory/storage 315 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 315 may be external to and/or removable from device 300, such as, for example, a Universal Serial Bus (USB) memory stick, a dongle, a hard disk, mass storage, off-line storage, or some other type of storing medium. Memory/storage 315 may store data, software, and/or instructions related to the operation of device 300.

Software 320 includes an application or a program that provides a function and/or a process. As an example, with reference to aggregator device 205, software 320 may include an application that, when executed by processor 310, provides a function and/or a process of the small cell aggregation service, as described herein. Additionally, with reference to small cell device 202, software 320 may include an application that, when executed by processor 310, provides a function and/or a process of the small cell aggregation service, as described herein. Software 320 may also include firmware, middleware, microcode, hardware description language (HDL), and/or other form of instruction. Software 320 may also be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces, optical interfaces, and/or wired interfaces. For example, communication interface 325 may include one or multiple transmitters and receivers, or transceivers. Communication interface 325 may operate according to a protocol stack and a communication standard.

Input 330 permits an input into device 300. For example, input 330 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 300 may be implemented in the same manner. For example, device 300 may be instantiated, created, deleted, or some other operational state during its life-cycle (e.g., refreshed, paused, suspended, rebooting, or another type of state or status), using well-known virtualization technologies. For example, access device 107, core device 122, and/or aggregator device, as described herein, may be a virtualized device.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a function or a process described herein. Alternatively, for example, according to other implementations, device 300 performs a function or a process described herein based on the execution of hardware (processor 310, etc.).

Figure 4:
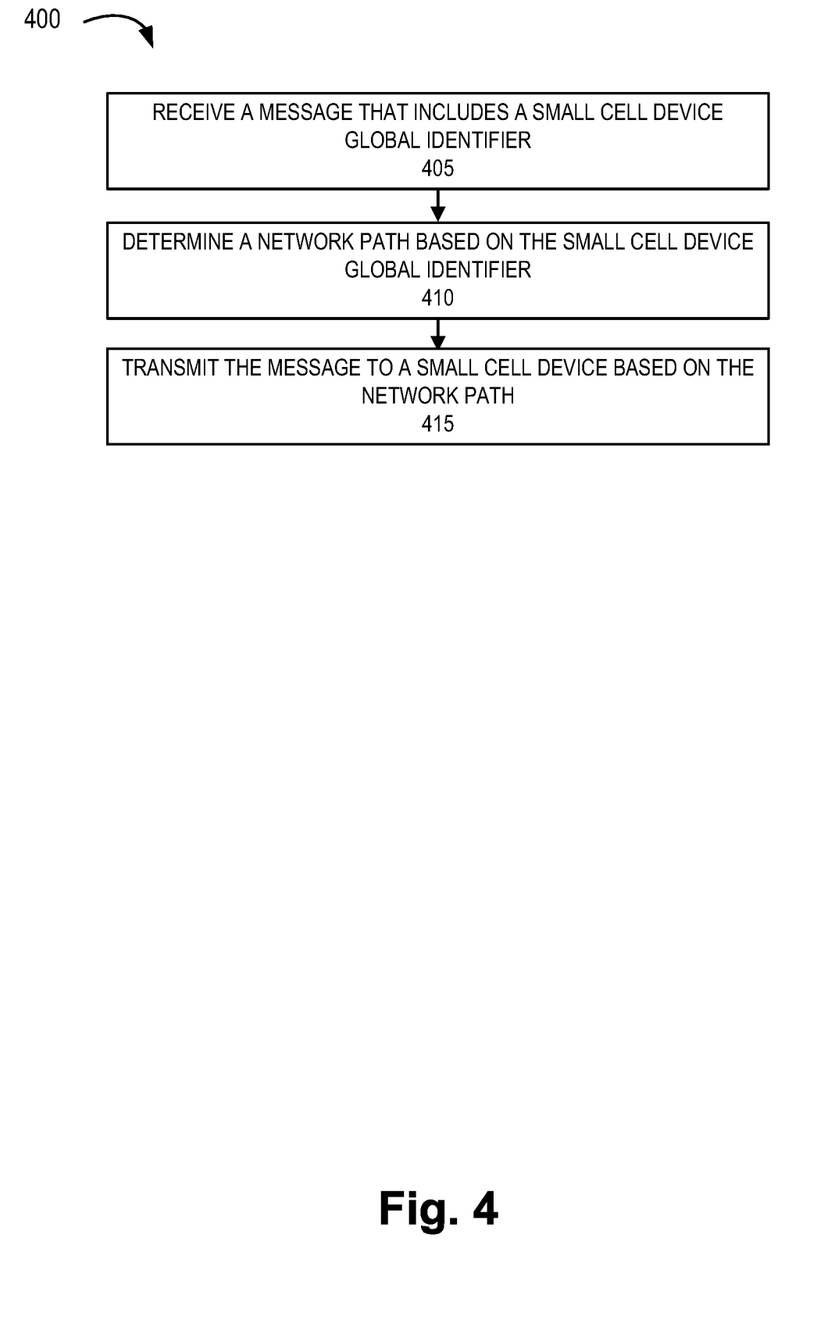
FIG. 4 is a flow diagram illustrating an exemplary process of an exemplary embodiment of the small cell aggregation service.

FIG. 4 is a flow diagram illustrating an exemplary process 400 of an exemplary embodiment of the small cell aggregation service. According to an exemplary embodiment, an intermediary network device, such as aggregator device 205 may perform a step of process 400. According to an exemplary implementation, processor 310 executes software 320 to perform the step of process 400, as described herein.

In block 405, aggregator device 205 may receive a message that includes a small cell device global identifier. The small cell device global identifier may include a globally unique identifier for aggregator device 205 and an identifier for small cell device 202 or small cell device 202 and a frequency/band/sub-coverage area of small cell device 202, for example. The message may be received from a core device 122, such as UPF 215, AMF 220, an application layer network device (e.g., a MEC server device or the like), or another network device that may communicate with small cell device 202 via core network 120, for example.

In block 410, aggregator device 205 may determine a network path based on the small cell device global identifier. For example, aggregator device 205 may store small cell device aggregation service data that may map or correlate communication links or interfaces (e.g., N2 and/or N3 interfaces), which are between aggregator device 205 and small cell devices 202, with the small cell device global identifiers. Aggregator device 205 may compare the small cell device global identifier to the small cell device aggregation service data. Based on the result of the comparison, aggregator device 205 may select the network path that matches the correlated small cell device global identifier. In block 415, aggregator device 205 may transmit the message to small cell device 202 based on the network path and associated small cell device global identifier.

As previously described, the message may be a user plane message, a control plane message, or another type of plane message (e.g., network management plane, etc.). For example, the control plane message may be a stream control transmission protocol (SCTP) message, a non-access stratum (NAS) message, a next generation application protocol (NGAP) message, or another type of protocol and/or message that may be transmitted via an N2 interface. According to another example, the user plane message may by an application service message or another type of message that may be transmitted via an N3 interface. The application service may relate to extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), voice, conferencing, etc.), video streaming, and/or other types of wireless application services. The application service may be provided to an end device (e.g., UE, IoT device, mobile device, or the like) via small cell device 202.

FIG. 4 illustrates an exemplary embodiment of a process of the small cell aggregation service, according to other exemplary embodiments, the small cell aggregation service may perform additional operations, fewer operations, and/or different operations than those illustrated and described. For example, according to an embodiment in which a hierarchical arrangement of aggregator devices is implemented (e.g., two or more), a highest tier or primary aggregator device may select the network path based on the small cell device global identifier, which may include global identifiers for each aggregator device connected (directly or indirectly) to small cell device 202.

Figure 5:
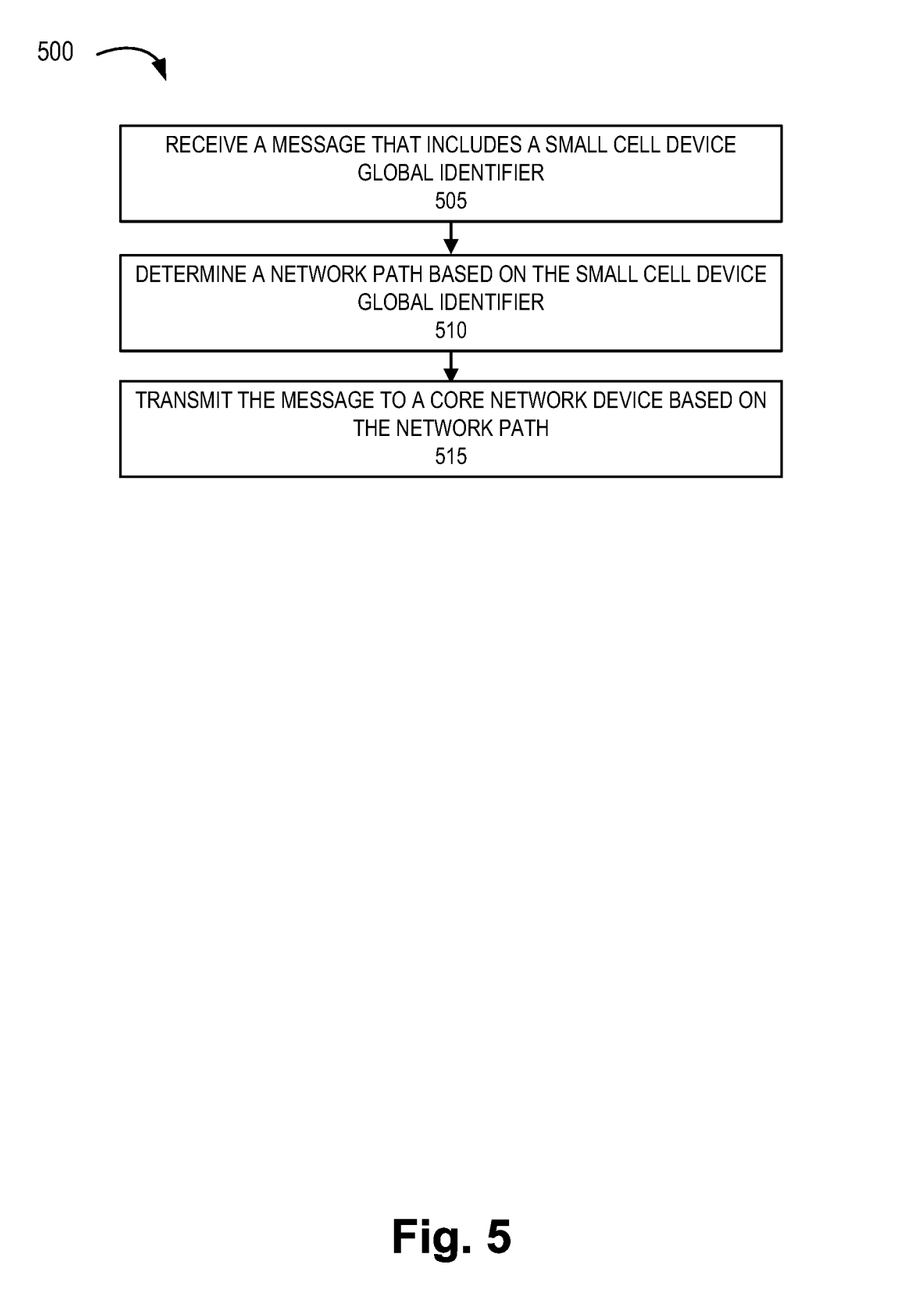
FIG. 5 is another flow diagram illustrating another exemplary process of an exemplary embodiment of the small cell aggregation service.

FIG. 5 is a flow diagram illustrating an exemplary process 500 of an exemplary embodiment of the small cell aggregation service. According to an exemplary embodiment, an intermediary network device, such as aggregator device 205 may perform a step of process 500. According to an exemplary implementation, processor 310 executes software 320 to perform the step of process 500, as described herein.

In block 505, aggregator device 205 may receive a message that includes a small cell device global identifier. The small cell device global identifier may include a globally unique identifier for aggregator device 205 and an identifier for small cell device 202 or small cell device 202 and a frequency/band/sub-coverage area of small cell device 202, for example. The message may be received from small cell device 202.

In block 510, aggregator device 205 may determine a network path based on the small cell device global identifier. For example, aggregator device 205 may store small cell device aggregation service data that may map or correlate communication links or interfaces (e.g., N2 and/or N3 interfaces), which are between aggregator device 205 and core device(s) 122, with the small cell device global identifiers. In block 515, aggregator device 205 may transmit the message to core device 122 based on the network path and associated small cell device global identifier.

FIG. 5 illustrates an exemplary embodiment of a process of the small cell aggregation service, according to other exemplary embodiments, the small cell aggregation service may perform additional operations, fewer operations, and/or different operations than those illustrated and described. For example, according to an embodiment in which a hierarchical arrangement of aggregator devices is implemented (e.g., two or more), a lowest tier or a secondary aggregator device may select the network path based on the small cell device global identifier, which may include global identifiers for each aggregator device connected (directly or indirectly) to core device 122.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described regarding the processes illustrated in FIGS. 4 and 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   receiving, by a network device of a radio access network, a message that includes a global identifier of a small cell device, wherein the global identifier includes a globally unique identifier of the network device and an identifier of the small cell device;
   determining, by the network device, a network path for the message based on the global identifier of the small cell device; and
   transmitting, by the network device based on network path, the message to a destination of the message.

2. The method of claim 1, wherein the transmitting further comprises:
   transmitting, by the network device via an N2 interface or an N3 interface, the message to the small cell device or a network device of a core network.

3. The method of claim 1, wherein the identifier of the small cell device identifies the small cell device and a first radio spectrum among multiple radio spectrums of the small cell device.

4. The method of claim 1, wherein the identifier of the small cell device identifies the small cell device and a first coverage area among multiple coverage areas of the small cell device.

5. The method of claim 1, wherein the identifier of the small cell device identifies the small cell device and an operator of the small cell device.

6. The method of claim 1, further comprising:
storing, by the network device, data that correlates global identifiers of small cell devices, which are communicatively coupled to the network device and include the small cell device, with network paths; and
using, by the network device, the data to determine the network path that is one of the network paths.

7. The method of claim 1, wherein the small cell device is one of a Fifth Generation (5G) femtocell device, a 5G picocell device, a 5G microcell device, or a home next generation Node B device.

8. The method of claim 1, wherein the network device includes a gateway device that is communicatively coupled to multiple small cell devices of a first number via at least one of multiple N2 interfaces of the first number or multiple N3 interfaces of the first number and communicatively coupled to at least one of a user plane function (UPF) via a single N3 interface or an access and mobility management function (AMF) via a single N2 interface.

9. A network device comprising:
a processor configured to:
receive a message that includes a global identifier of a small cell device, wherein the global identifier includes a globally unique identifier of the network device and an identifier of the small cell device, wherein the network device is of a radio access network;
determine a network path for the message based on the global identifier of the small cell device; and
transmit, based on network path, the message to a destination of the message.

10. The network device of claim 9, wherein, when transmitting, the processor is further configured to:
transmit the message via an N2 interface or an N3 interface, to the small cell device or a network device of a core network.

11. The network device of claim 9, wherein the identifier of the small cell device identifies the small cell device and a first radio spectrum among multiple radio spectrums of the small cell device.

12. The network device of claim 9, wherein the identifier of the small cell device identifies the small cell device and a first coverage area among multiple coverage areas of the small cell device.

13. The network device of claim 9, wherein the identifier of the small cell device identifies the small cell device and an operator of the small cell device.

14. The network device of claim 9, wherein when determining the network path, the processor is further configured to:
store data that correlates global identifiers of small cell devices, which are communicatively coupled to the network device and include the small cell device, with network paths; and
use the data to determine the network path that is one of the network paths.

15. The network device of claim 9, wherein the small cell device is one of a Fifth Generation (5G) femtocell device, a 5G picocell device, a 5G microcell device, or a home next generation Node B device.

16. The network device of claim 9, wherein the network device includes a gateway device that is communicatively coupled to multiple small cell devices of a first number via at least one of multiple N2 interfaces of the first number or multiple N3 interfaces of the first number and communicatively coupled to at least one of a user plane function (UPF) via a single N3 interface or an access and mobility management function (AMF) via a single N2 interface.

17. A non-transitory computer-readable storage medium storing instructions executable by a processor of a network device of a radio access network, wherein the instructions are configured to:
receive a message that includes a global identifier of a small cell device, wherein the global identifier includes a globally unique identifier of the network device and an identifier of the small cell device, wherein the network device is of a radio access network;
determine a network path for the message based on the global identifier of the small cell device; and
transmit, based on network path, the message to a destination of the message.

18. The non-transitory computer-readable storage medium of claim 17, wherein the identifier of the small cell device identifies the small cell device and a first radio spectrum among multiple radio spectrums of the small cell device.

19. The non-transitory computer-readable storage medium of claim 17, wherein the identifier of the small cell device identifies the small cell device and an operator of the small cell device.

20. The non-transitory computer-readable storage medium of claim 17, wherein the instruction are further configured to:
store data that correlates global identifiers of small cell devices, which are communicatively coupled to the network device and include the small cell device, with network paths; and
use the data to determine the network path that is one of the network paths.

\* \* \* \* \*